Jan. 8, 1924.
A. A. CLOKEY
1,480,243
SIGNALING SYSTEM
Filed Nov. 5, 1921
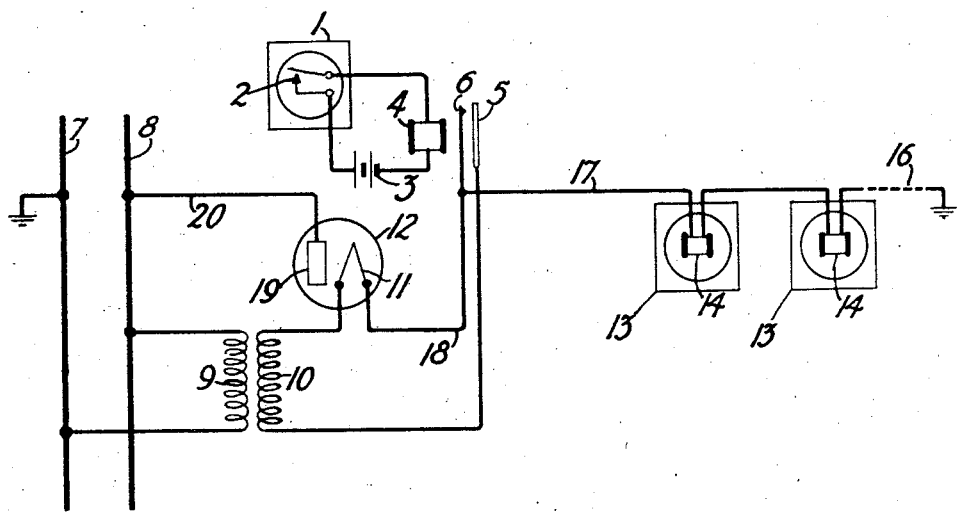
Inventor:
Allison A. Clokey.
by Jul CR. Palmer
Att'y.

Patented Jan. 8, 1924.

1,480,243

UNITED STATES PATENT OFFICE.

ALLISON A. CLOKEY, OF RUTHERFORD, NEW JERSEY, ASSIGNOR TO WESTERN ELECTRIC COMPANY, INCORPORATED, OF NEW YORK, N. Y., A CORPORATION OF NEW YORK.

SIGNALING SYSTEM.

Application filed November 5, 1921. Serial No. 513,018.

*To all whom it may concern:*

Be it known that I, ALLISON A. CLOKEY, a citizen of the United States, residing at Rutherford, in the county of Bergen, State of New Jersey, have invented certain new and useful Improvements in Signaling Systems, of which the following is a full, clear, concise, and exact description.

This invention relates in general to electric control systems and more particularly to a synchronizing system for the operation, by means of alternating current, of secondary clocks, time stamps and similar apparatus.

Since most synchronizing systems are designed for use with a direct current source of supply, considerable difficulty has been experienced in operating such systems in localities where only an alternating current source of supply is available. Under such conditions, it has been the common practice to either employ storage batteries, motor generator sets or an electrolytic rectifier. These methods, however, have been found to be unsatisfactory not only because of the prohibitive cost of installation but because of the high maintenance cost.

It is therefore the object of the present invention to provide an electric control system adapted to operate on alternating current which is simple, inexpensive to install and may be operated at small expense.

A further object of the invention is to provide such a system in which the apparatus involved is not subject to deterioration and in which electrical energy is consumed only during the period of operation.

To accomplish these objects and in accordance with a feature of the invention there is provided a circuit control system in which a thermionic rectifying device is employed for converting the alternating current into a unidirectional current, the heating element of this rectifying device being under the control of a master relay so that electrical current is consumed only when the control devices are being operated.

This and other features of the invention will be more clearly understood by reference to the accompanying drawing in which there is disclosed a clock synchronizing system embodying the features of the invention.

Referring to the drawings more in detail, a master clock 1 is provided with a periodic circuit closing device 2 through which energy is permitted to pass from battery 3 to energize a relay 4. The switch 2, it will be understood, is operated by the master clock and may be adjusted so that it will close for a period of one second each hour, or, if desired, for any other period. Relay 4, when energized, moves its armature 5 into engagement with contact 6, thus closing the master switch. An alternating current source, the leads of which are designated by 7, 8, has connected across its mains the primary 9 of a transformer, the secondary winding 10 of which is controlled by the master switch. In series with the secondary 10 is a filament 11 of a two-element thermionic rectifier 12. Electrically controlled clocks 13 are provided with electromechanical synchronizing devices 14, which are energized during the synchronizing period over a grounded circuit from the alternating current source and through the rectifier 12 as follows: from ground, alternating current mains 7, 8, conductor 20, plate 19, heated filament 11, conductors 18, 17, synchronizing devices 14, conductor 16 to ground.

Since the circuit of the rectifier filament 11 is controlled by the master switch, the filament is heated only during the period of sychronization, when current is permitted to flow over the circuit, including the synchronizing devices 14. As a consequence, current consumption from the alternating current mains is controlled indirectly through the heating of filament 11 and no waste of energy occurs during the time when the clocks are not being synchronized. Although the time required for heating the filament 11 causes a slight lag between the operation of the rectifier and the relay 4, this lag is compensated for by the operation of the device during the time consumed for cooling the filament after the heating circuit is opened.

Synchronizing devices 14 are relatively sluggish in their action, and the pulsating current which is supplied the synchronizing circuit, will operate them satisfactorily, causing, at best, only a slight humming while they are functioning.

Although the system is shown with a half wave rectifier, a two wave rectifier may be employed, or a capacity may be used with the half wave rectifier to furnish a more uniform current to the synchronizing devices. Such modifications are well known in the art.

What is claimed is:

1. In an electric control system, the combination with a controlling device, of a series of auxiliary devices to be controlled, electromagnetic means for controlling said auxiliary devices, means for operating said electromagnetic means comprising a source of alternating current, and a thermionic rectifying device, and means associated with said controlling device for rendering said rectifying device operative.

2. In a clock synchronizing system, a master clock, a second clock controlled by said master clock, a source of alternating current, means for rectifying said current whereby said second clock may be synchronized, and means operable only during the period of synchronization for controlling the operation of said rectifying means.

3. In a synchronizing system, a master clock, a series of controlled clocks, synchronizing magnets for said clocks, a source of alternating current, a rectifier, and control means operated only during the period of synchronization to permit the energization of said magnets.

4. In a signaling system, a relay, a switch controlled thereby, a thermionic rectifier having a heating circuit controlled by said switch, an alternating current source, and a series of signaling devices energized periodically by said source through said rectifier.

5. In a signaling system, a source of alternating current, a rectifying circuit comprising a two element rectifier, a heating circuit for one of the elements of said rectifier, a relay controlling said circuit, a series of signaling devices intermittently energized over a circuit from said alternating current source through said rectifier.

6. In an electric control system, a relay, a switch controlled thereby, a transformer, a thermionic rectifier having an intermittently operated filament circuit operable through said transformer, a second circuit comprising the plate and filament of said rectifier, a source of alternating current, and a series of electromagnetic devices energized periodically by said source through the said second circuit of the rectifier.

In witness whereof, I hereunto subscribe my name this 2nd day of November A. D., 1921.

ALLISON A. CLOKEY.